United States Patent Office 3,043,305
Patented July 10, 1962

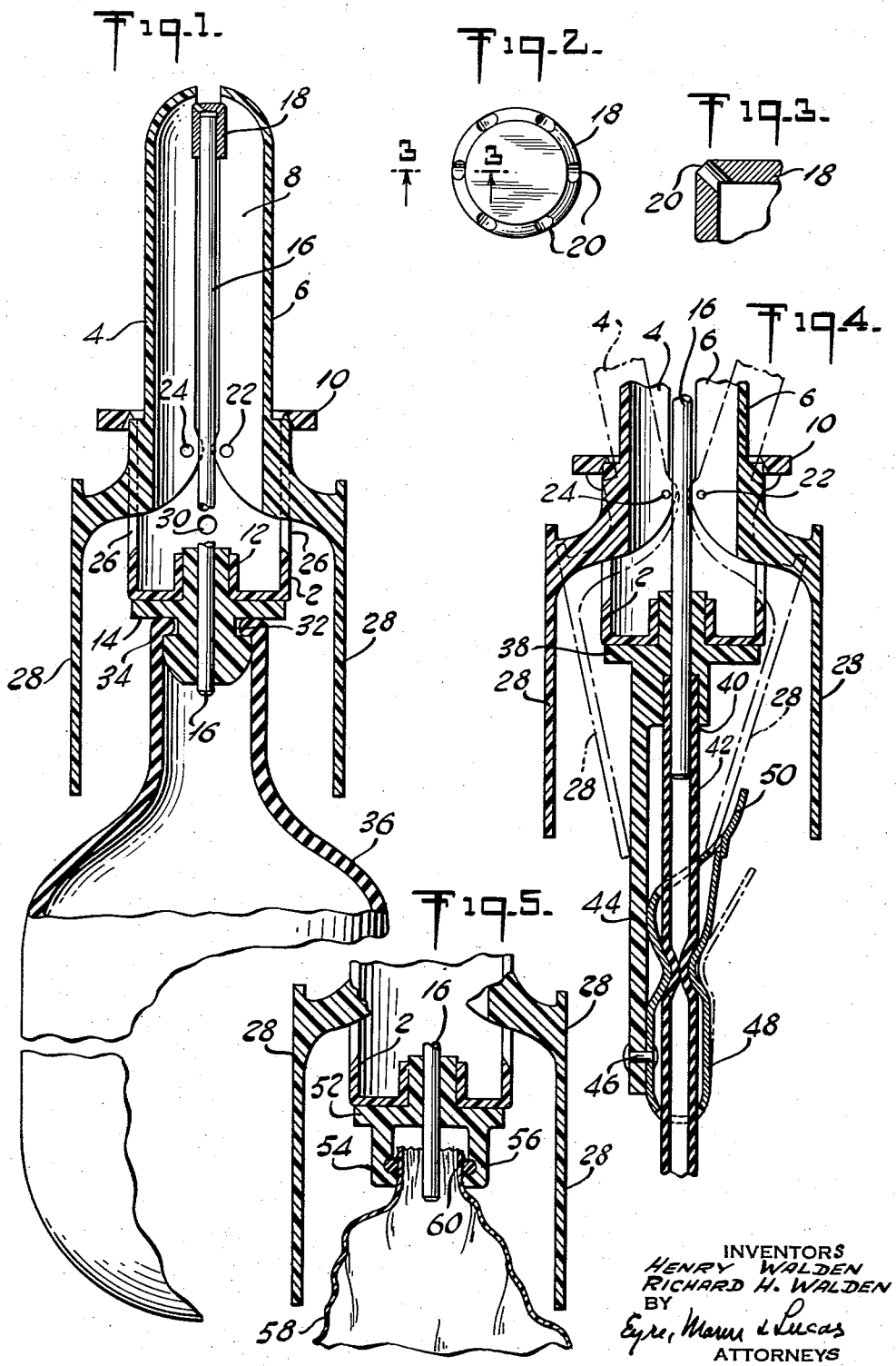

3,043,305
DEVICE FOR DELIVERING MEDICAMENTS OR THE LIKE TO A BODY CAVITY
Henry W. Walden, 124 W. 55th St., New York, N.Y., and Richard H. Walden, 230 Hilton Ave., Plandome, N.Y.
Filed Mar. 6, 1959, Ser. No. 797,698
1 Claim. (Cl. 128—251)

The present invention relates to irrigation or spray devices such as are used for the injection and distribution of medicaments, antiseptics, cleansing preparations and other materials in liquid, mist, foam, stream, spray, powder or any other form into body cavities. More particularly the invention comprises an improved device of this character particularly adapted for injection of material into the vagina. The new device is adapted for ready and simple self-use, insures a uniform distribution of the material throughout the body cavity, protects against entrapment of air in a body orifice, may be readily dismantled for cleaning, and is designed for coupling to different types of medicament, therapeutic or cleansing material containers. The new device is of the general type of device disclosed in our pending application Serial No. 758,730 filed September 3, 1958.

In general the new device of the present invention comprises a speculum-like structure so constructed as to be readily connected to a syringe, to an irrigation bag, or to other types of containers. The new device includes also an improved dispensing element particularly adapted to give a "whirl" spray to liquid or powder issuing therefrom into the body cavity.

The device, as in the structure of the above mentioned pending application, comprises a pair of pivoted members which in closed position form a somewhat tubular enclosure for ready introduction into the body cavity and which after introduction may be separated to dilate the cavity. Readily accessible finger engaging parts provide means for manipulating the pivoted members and, in one embodiment of the invention, serve for automatic release of the material to be inserted into the body cavity.

For a better understanding of the invention and of specific embodiments thereof reference may be had to the accompanying drawing of which:

FIG. 1 is a longitudinal section view of the irrigation or spray device of the invention shown coupled to a syringe type medicament container;

FIG. 2 is a top view on a larger scale of the dispensing element of the device of FIG. 1;

FIG. 3 is a longitudinal sectional view, on a still larger scale, of the dispensing element and taken on the line 3—3 of FIG. 2;

FIG. 4 is a fragmentary vertical sectional view of the device of the invention shown arranged for connection to an irrigation bag; and FIG. 5 is a fragmentary vertical sectional view of the device of the invention shown arranged for connection to a disposal medicament supply bag.

In FIG. 1 the invention is embodied in a device comprising a casing 2, which may be, and preferably is, of plastic material and which pivotally supports two jaws 4 and 6. The jaws, when closed, as in the view of FIG. 1, define a generally tubular enclosure 8. A rim or collar 10 about the upper end of the casing 2 serves to limit penetration of the jaws 4 and 6 into the body cavity. The base of the casing 2 has a reentrant tubular portion 12 for reception and frictional gripping of the cylindrical neck of a coupling member 14 carrying a tube 16. Tube 16 extends through the chamber 8 substantially to the end thereof. Mounted on the end of tube 8 is a dispensing element or cap 18 provided at the junction of its side and end walls with six passages 20 each disposed at an angle of about 45° to the axis of the tube 16. The jaws 4 and 6 are pivotally mounted on the wall of the casing 2 at points 22 and 24. Below the pivot points the jaws diverge outwardly through longitudinal openings 26 in the side wall of the casing 2 and then extend downwardly to provide finger engaging pieces 28. The casing 2 is provided with one or more openings or vents 30 to insure that no air will be trapped in the body cavity upon initiation of supply of medicament thereto. In the embodiment of the invention illustrated in FIG. 1 the coupling element 14 is provided with an annular groove 32 for reception of the lip 34 of the neck of a syringe 36.

In use of the device of FIG. 1, after the syringe 36 is fastened to the coupling member 14 and the neck of member 14, carrying the tube 16, is inserted into the reentrant portion 12 of the casing 2, the arms or jaws 4 and 6, in the closed position of the drawing, are inserted into the body cavity. The jaws are then opened by pressure on the finger pieces 28 and medicament from the syringe is delivered by squeezing the syringe. The material will issue from the holes 20 of the dispenser 18 with a whirling action and be delivered uniformly to the wall of the body cavity, the opened jaws expanding the cavity and in the thus retracted position being cleared by the issuing medicament. Air will not be forced into the body cavity because of the provision of the vent or vents 30 in the casing 2.

The above described structure of FIG. 1 may be readily employed for attachment to other types of containers. FIG. 4 illustrates the device of FIG. 1 coupled to a tube of rubber or other resilient material of an irrigation bag. This embodiment of the invention differs from that of FIG. 1 only in the conformation of the coupling element. The coupling element 38 of FIG. 4 like the coupling element 14 of FIG. 1 carries the tube 16. At its lower end the element 38 is cut away around the tube 16 to provide an annular recess 40 for reception of the end of the rubber tube 42 of an irrigation bag (not shown). The coupling 38 is provided with an elongated portion 44 upon which is mounted, as by a rivet 46, a metal spring clip 48 of conventional construction. The clip 48 receives the rubber tube 42 and, in the solid line position illustrated in FIG. 4, pinches the rubber tube to prevent delivery of liquid therethrough. The clip 48 is so mounted that the upper end or latch 50 thereof is in the path of travel of one finger piece 28 when the finger pieces are moved to jaw opening position. Accordingly, in this embodiment of the invention, opening of the jaws automatically opens clip 48 to permit liquid from the irrigation bag connected to the tube 42 to flow into the tube 16 and from that tube to the dispenser 18 and thence to the body cavity.

FIG. 5 illustrates adaptation of this device to use with disposable medicament containers. In this embodiment of the invention the adapter or coupling element 52, carrying the tube 16 is formed with a depending sleeve 54 provided with an annular groove 56 in the inner wall thereof. A disposable bag 58 of suitable thermoplastic material, such as polyethylene, polypropylene, Saran (polyvinylidene chloride), polyvinyl chloride, Pliofilm (rubber hydrochloride), or the like, formed at its neck with a ring 60 of the same material and of a diameter to fit snugly within the groove 56 in the adapter. The ring and bag can be readily assembled by gathering the open end of a tubular bag about a mandrel, slipping the plastic ring over the mandrel and end of the bag and then applying heat to fuse the ring and bag together, the mandrel preventing collapse of the material while hot. When the arrangement of FIG. 5 is to be used, the desired quantity of medicament or other material is inserted into the bag through the relatively large opening at the neck thereof and the ring 60 is then snapped into the groove 56. After the jaws are introduced into the body orifice, the fingers 28 are pressed to open the jaws and the bag 58 is squeezed to force the medicament or other material up through the tube 16.

The invention has now been described with reference to three embodiments thereof. It will be apparent from the foregoing description that the invention comprises a construction which permits the use of the same device with various types of containers of medicament or cleansing materials. In each case the coupling member, being removable along with the tube carried thereby, insures that the parts may be readily cleaned after use and in each case, because of the provision of the vents in the casing 2, danger of entrapment of air within the body cavity is avoided. Although not specifically illustrated obviously the device of the invention could be attached, by means of suitably shaped coupling elements, to other than the specific containers heretofore illustrated. Although the specific dispensing element described in connection with FIGS. 1, 2 and 3 is particularly advantageous for use with syringe type containers, other types of dispensing elements could be used depending upon the particular material to be delivered to the body cavity. For example, if desired, the tube 16 throughout the length disposed within the chamber 8 could be provided with a series of holes as in the device of the previously mentioned pending application, or the dispensing element of the present invention could be provided with fewer or with a greater number of outlets. Preferably both jaws are pivotally mounted to as to be movable away from the dispensing element, but when uniform delivery of medicament in all directions is not required, obviously one fixed and one movable jaw would suffice. Various other changes within the scope of the accompanying claim could be made without departing from the spirit of the invention.

In the accompanying claim the term "medicament" is used broadly to include antiseptic and cleansing materials, such as water, as well as strictly medicinal material.

The following is claimed:

A speculum comprising a casing member, a chamber within the casing, a plurality of blades pivotally attached within and extending beyond the casing, and adapted for insertion into a body orifice, said blades in closed position defining an elongated chamber constituting a continuation of the casing chamber, a corresponding plurality of slots in the casing and, extending therethrough, finger pieces respectively attached to the blades within the casing for manually pivoting the blades to separate them after insertion into a body orifice, an opening in the casing formed with a reentrant wall, a coupling and closure member removably fitting against the reentrant wall of said opening, and having a passage extending therethrough from the casing chamber to the outside of the casing, and an ejection tube fitted into the passage of the coupling chamber and extending therefrom through the casing chamber into the elongated chamber, the outer portion of the coupling element being shaped for attachment to a medicament container for delivery of medicament to the ejection tube, whereby medicament from the medicament container is dispensed via the ejection tube, and the ejection tube and closure member are removable for cleaning, a spring clip carried by said coupling element and normally preventing flow of liquid through a resilient walled tube inserted therethrough and connected to the ejection tube, said finger pieces for separating said blades engaging, when moved into blade-opening position, a latch which, when engaged thereby, opens the clip to permit flow of fluid through the resilient walled tube within the clip.

References Cited in the file of this patent

UNITED STATES PATENTS

| | | |
|---|---|---|
| 1,202,193 | Kruger | Oct. 24, 1916 |
| 1,632,541 | Cortes | June 14, 1927 |
| 1,666,684 | Carstens | Apr. 17, 1928 |

FOREIGN PATENTS

| | | |
|---|---|---|
| 395,116 | Great Britain | July 13, 1933 |